350-167

4/4/78

SR

XR 4,082,450

United States Patent [19]

Lehman

[11] 4,082,450

[45] Apr. 4, 1978

[54] COMPACT ILLUMINATION SYSTEM FOR OPTICALLY PROVIDING A STRUCTURED PHOTORECEPTOR CHARGE DISTRIBUTION

[75] Inventor: Richard F. Lehman, Fairport, N.Y.

[73] Assignee: Xerox Corporation, Stamford, Conn.

[21] Appl. No.: 634,007

[22] Filed: Nov. 21, 1975

[51] Int. Cl.[2] .............................................. G03B 27/76

[52] U.S. Cl. ...................................... 355/71; 350/167; 355/69

[58] Field of Search ............... 350/167, 188, 190, 205, 350/206, 241; 355/69, 71, 1, 3 R, 8; 354/115

[56] References Cited

U.S. PATENT DOCUMENTS

| | | | |
|---|---|---|---|
| 1,463,132 | 7/1923 | Graf | 350/188 |
| 3,178,993 | 4/1965 | Ferris et al. | 350/167 |
| 3,397,023 | 8/1968 | Land | 350/205 X |
| 3,584,952 | 6/1971 | Gundlach et al. | 355/52 |
| 3,655,284 | 4/1972 | Agliata | 350/167 x |
| 3,785,262 | 1/1974 | Stroke | 354/100 X |
| 3,865,485 | 2/1975 | Yevick | 355/71 X |
| 3,936,173 | 2/1976 | Kidd et al. | 355/3 R |

*Primary Examiner*—Fred L. Braun

[57] ABSTRACT

Apparatus for providing a structured radiation pattern in the charge distribution of a photoreceptor in electrographic reproduction machines. The apparatus is comprised of a source of radiation, a plurality of apertures and a lens system for focusing the radiation transmitted by the apertures onto a charged photoreceptor. The position of the apparatus relative to the photoreceptor can provide a method for control of the structure of the photoreceptor charge. The photoreceptor charge structure can be further controlled by providing preselected patterns for radiation transmitted by the apertures. The charge distribution of the photoreceptor can be structured to form a line or a dot pattern.

6 Claims, 5 Drawing Figures

Figure 1:
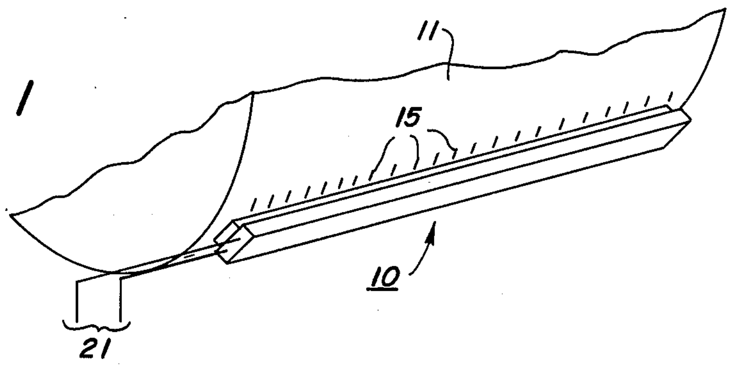

COMPACT ILLUMINATION SYSTEM FOR OPTICALLY PROVIDING A STRUCTURED PHOTORECEPTOR CHARGE DISTRIBUTION

This invention relates generally to electrostatographic reproduction of an image and more particularly to apparatus for improved electrostatographic image reproduction whereby a latent electrostatic image stored on the photoreceptor is provided with structure. The apparatus provides for optically structuring the electrostatic distribution on a photoreceptor.

It is known in the art of electrostatographic image reproduction that improved image reproduction can be provided by modulating or structuring the charge distribution of a latent electrostatic image on a photoreceptor. The structured electrostatic charge distribution is known, when used in conjunction with appropriate development techniques, to provide improved solid area and continuous tone image reproduction.

It is known in the prior art to provide the charge distribution on the photoreceptor with structure by placing a screen, either in close proximity to the original image to be reproduced or in close proximity to the photoreceptor itself, for interrupting the image radiation impinging on the photoreceptor from the original image and thereby providing the latent electrostatic image formed in the photoreceptor with structure. The stored photoreceptor electrostatic charge, in the local region of the impinging radiation is dissipated in relation to the radiation intensity.

It is further known in the prior art that the charge distribution on a charged photoreceptor surface can be changed by application of radiation thereto. Indeed, the formation of the latent electrostatic image is a result of this phenonemon. Thus, by appropriately patterned radiation impinging on the photoreceptor, a photoreceptor charge distribution can be provided with structure.

The space available for providing an illuminating apparatus is frequently limited. The space limitation is further complicated by the general requirement that the apparatus should be sufficiently removed from the photoreceptor to minimize the possibility of contact between the photoreceptor and the illumination source to reduce the potential for damage to the photoreceptor surface.

It is therefore an object of the present invention to provide apparatus used in conjunction with an electrostatographic image reproduction machine to improve image reproduction.

It is a further object of the present invention to provide a radiation source for formation of a predetermined distribution of charge on a photoreceptor surface.

It is yet another object of the present invention to provide a compact illumination source capable of applying a radiation pattern to the surface of photoreceptor.

It is a more particular object of the present invention to provide a light source, an aperture screen and a compact lens system for forming a radiation pattern on a photoreceptor of an electrostatographic machine.

It is yet another object of the present invention to provide an illumination source exhibiting a radiation pattern including overlapping aperture images.

It is yet another more particular object of the present invention to provide a light source, an aperture screen with predetermined radiation characteristics and a compact lens system for forming a radiation pattern on a photoreceptor of an electrostatographic machine.

It is yet another object of the present invention to provide an illumination source exhibiting an adjustable radiation pattern.

The aforementioned and other objects are accomplished by the present invention by a compact illumination source including a source of optical radiation, a screen for selectively transmitting a pattern of the optical radiation and a lens system for focusing the transmitted radiation pattern. The lens system can be a fly's eye type lens system, strip lens system, or other compact lens system. The lens system is adapted to provide a radiation pattern on the photoreceptor surface in which pattern components can be illuminated by a plurality of radiating transmitting apertures. The illumination source can be activated by providing a continuous line pattern of the optical radiation on the moving, charged photoreceptor, thereby providing a line pattern for the photoreceptor charge distribution. By flashing the illumination source on the moving photoreceptor, a dot pattern can be formed for the photoreceptor charge distribution.

The transmitted radiation pattern can be comprised of a multiplicity of illuminated regions. The illuminated regions can have an uniform illumination intensity or the regions can have a structured illumination intensity.

Figure 2:
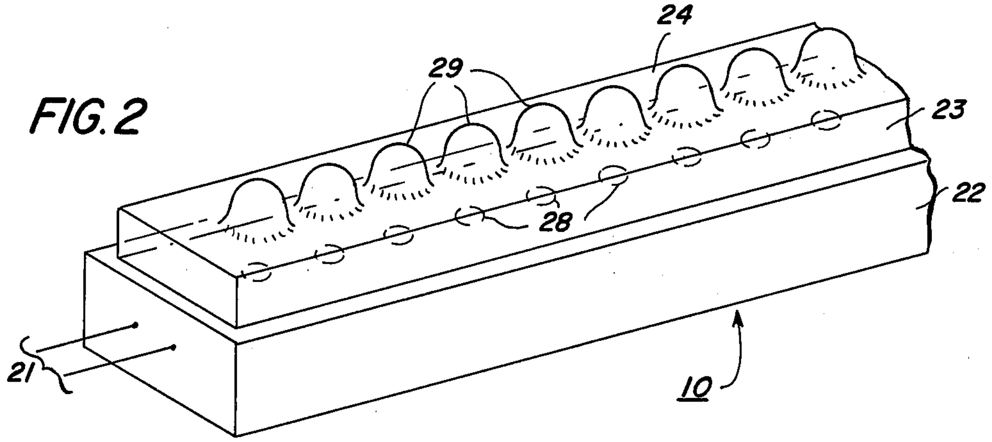
Figure 3:
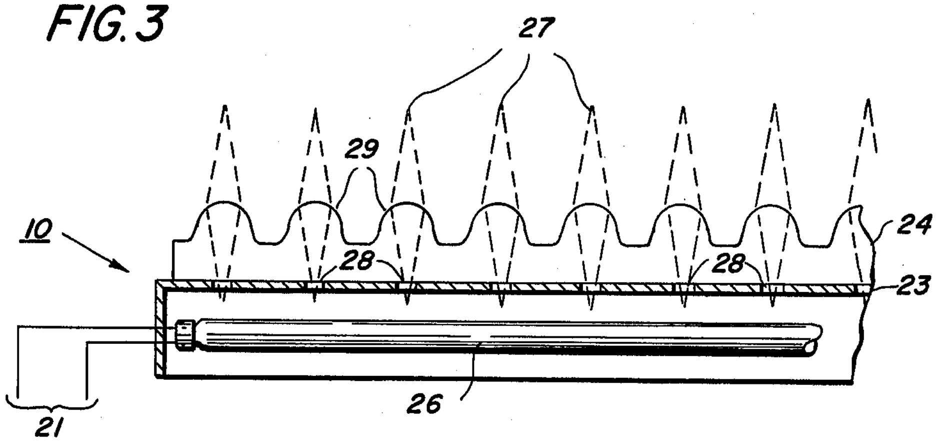

These and other features of the present invention will be understood upon reading of the following specification along with the Figures of which:

FIG. 1 is schematic diagram of the relation of the compact optical source to the photoreceptor surface, FIG. 2 is a schematic view of the illumination source according to the preferred embodiment; and FIG. 3 is a schematic cross-sectional view of the illumination source according to the preferred embodiment.

Referring now to FIG. 1, the relation of the compact illumination source 10 to the photoreceptor surface 11 in an electrostatographic reproduction machine is shown. The source 10 is positioned relative to the moving photoreceptor surface 11 (by means not shown) so that radiation 15 is applied to the surface 11 in a preselected pattern. Couplings 21 provide power to activate a source of radiation forming part of the compact illumination source.

Referring next to FIG. 2, a schematic representation of the compact illumination source 10 is shown. Source 10 includes a source of radiation 22 with a surface of the radiation source 22 exposed in the direction of the photoreceptor surface. Over the exposed portion of the radiation source 22 is positioned an optical stop 23 with a plurality of apertures 28. In the vicinity of stop 23, a lens system 24 is positioned. The lens system 24 has included therewith a plurality of lenses or lenslets 29. In the preferred embodiment, the lenses 29 and the supporting material are fabricated from a single material reducing scattering which can occur at optical interfaces. However, a strip lens system, in which, one or more lenses can be associated with each optical path and secured by appropriate support apparatus, can be employed.

Referring next to FIG. 3, the cross-sectional view of source 10, the lenses 29 are shown positioned relative to apertures 28 in such a manner that the image of the apertures can be focused (i.e. on the photoreceptor surface). The focusing of the image of aperture 28 (i.e. the radiation originating a radiation source 26 and transmitted through the apertures) is indicated by the dotted lines 27. At one distance between the photoreceptor and the source 10, the focused aperture image magnitudes will be the minimum. By varying the distance between the source 10 and the photoreceptor surface 11, the size of the aperture image can be varied and can provide a control of the size of the pattern.

The radiation from the compact optical source 10 applied to the charged photoreceptor surface provides, by local distribution of charge in the region whereon the radiation is focused, a local pattern of charge. This pattern of charge is analogous to the charge pattern determined by screens used to provide improved image reproduction in electrostatographic systems. The reproduction of halftones and solid areas can be enhanced with charge structuring techniques. Furthermore, as will be clear to those skilled in the art, the pattern on the charged photoreceptor surface from the illumination source 10, can be formed on the charged photoreceptor surface before or after the formation of the latent image. Furthermore, it will be clear to those skilled in the art that, by constant activation of the illumination source 10, a line pattern can be formed in the photoreceptor charge distribution, the photoreceptor typically being in continuous motion. By pulsing the radiation source 26, a dot pattern can be formed in the photo-receptor charge distribution.

While the preferred embodiment illustrated in FIG. 2 includes a single row of lenses, it will be clear that an array of lenses can be employed without departing from the invention. Furthermore, the lenses 29 can be replaced by portions of cylindrical lenses formed in system 24, and the apertures 28 can be comprised of slits, the slits and the cylindrical lenses being parallel and positioned relative to each other in order to focus the slit on the photoreceptor surface.

It is further clear that by defocusing the aperture images on the photoreceptor surface, for example, by changing the distance between the illumination source and the photoreceptor surface, a distribution of radiation intensity associated with each aperture can be produced. The resulting photoreceptor charge pattern, associated with each aperture, can be provided with a range of charge densities. By analog to the charge distribution provided by an absorbing screen and utilized to provide range extension, the resulting charge structure can provide an extended development range and an improved image production. The charge density, associated with each aperture, can also be provided with a variable density by providing a material with variable transmission characteristics at each aperture.

The above description is included to illustrate the operation of the preferred embodiment and is not meant to limit the scope of the invention. The scope of the invention is limited only by the following claims. A person skilled in the art can readily discern changes and variation in the above description which are yet within the spirit and scope of the invention.

What is claimed is:

1. A system for applying a structured radiation pattern to a charged photoreceptor surface in an electrostatographic reproduction apparatus, including:

an extended source of radiation, an apertured opaque material extending along said source between said source and said photoreceptor surface, said opaque material defining a plurality of apertures therealong, a lenticular strip member extending along said source between said opaque material and said photoreceptor surface, said source, said opaque material, and said lenticular strip together forming an integral pattern projector, said lenticular strip including a plurality of lenselets for imaging said plurality of apertures on said photoreceptor surface to create therein a dot pattern corresponding to said plurality of apertures.

2. A system as defined in claim 1 in which said photoreceptor surface is movably disposed relative to said pattern projector, whereby the charge pattern imparted to said photoreceptor is a plurality of spaced lines.

3. A system as defined in claim 2 in which said source of radiation is pulsed on and off while said photoreceptor moves so that the resulting charge pattern on said photoreceptor is a dot pattern.

4. A system for applying a structured radiation pattern to a charged photoreceptor surface in an electrostatographic reproduction apparatus, including:

an extended source of radiation;

a stop member extending along said source between said source and said photoreceptor surface, said stop member defining a plurality of apertures therealong;

a lenticular strip member extending along said stop member between said stop member and said photoreceptor surface, said lenticular strip member including a plurality of lenslets;

said stop member and said photoreceptor surface being in object and image conjugate relationship with respect to said lenslets, whereby said apertures are imaged at said photoreceptor surface to create thereon an image pattern corresponding to said plurality of apertures.

5. A system as defined in claim 4 in which said photoreceptor surface is movably disposed relative to said stop member and said lenticular strip member, whereby the image pattern imparted to said photoreceptor surface is a plurality of spaced lines.

6. A system as defined in claim 5 in which said source of radiation is pulsed on and off while said photoreceptor moves so that the resulting image pattern on said photoreceptor is a dot pattern.

* * * * *